US012729010B2

(12) United States Patent
Hung et al.

(10) Patent No.: US 12,729,010 B2
(45) Date of Patent: Sep. 8, 2026

(54) SYSTEMS AND METHODS FOR CALCULATING REFUELING TANKER BOOM 3D POSITION FOR AERIAL REFUELING

(71) Applicant: The Boeing Company, Arlington, VA (US)

(72) Inventors: Fan Hin Hung, Los Angeles, CA (US); Deepak Khosla, Camarillo, CA (US); Shawn Chamberlain, Federal Way, WA (US); Daniel O'Shea, Seattle, WA (US); Neale Ratzlaff, Los Angeles, CA (US); Tameez Latib, Calabasas, CA (US); Haden Smith, Guyton, GA (US); Leon Nguyen, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 29 days.

(21) Appl. No.: 18/525,318

(22) Filed: Nov. 30, 2023

(65) Prior Publication Data

US 2025/0178741 A1 Jun. 5, 2025

(51) Int. Cl.
*B64D 43/00* (2006.01)
*B64D 39/06* (2006.01)
*G05D 1/00* (2006.01)

(52) U.S. Cl.
CPC ............. *B64D 43/00* (2013.01); *B64D 39/06* (2013.01); *G05D 1/104* (2013.01)

(58) Field of Classification Search
CPC ........ B64D 43/00; B64D 39/06; B64D 39/00; G05D 1/104; G06T 7/73; G06T 15/06;
(Continued)

(56) References Cited

U.S. PATENT DOCUMENTS 7,980,512 B1 * 7/2011 Speer ................. C07D 271/113 244/135 A
8,854,433 B1 10/2014 Rafii
(Continued)

FOREIGN PATENT DOCUMENTS

CN 110097574 8/2019
EP 3566949 A1 * 11/2019 ............. B64D 39/00
(Continued)

OTHER PUBLICATIONS

Gong et al. "Research of an Unmanned Aerial Vehicle Autonomous Aerial Refueling Docking Method Based on Binocular Vision" (Year: 2023).*

(Continued)

*Primary Examiner* — Assres H Woldemaryam
(74) *Attorney, Agent, or Firm* — Massey Bean & Lewis

(57) ABSTRACT

Disclosed herein is methods, systems, and aircraft for performing image analysis for aiding refueling operations. A tanker aircraft includes a camera, a refueling boom, a camera configured to generate a two-dimensional (2D) image of the refueling boom, a processor, and non-transitory computer readable storage media storing code. The code is executable by the processor to perform operations including receiving the two-dimensional (2D) image from the camera, determining 2D keypoints of the refueling boom located within the 2D image based on a predefined point model of the refueling boom, determining a 6 degree-of-freedom (6DOF) pose using the 2D keypoints and the corresponding three-dimensional (3D) space 3D keypoints, optimizing 3D keypoints associated with moveable components of the refueling boom in response to a plurality of boom control parameters to produce optimized 3D keypoints, and estimating a position of a tip of the refueling boom based on the 6DOF pose.

20 Claims, 5 Drawing Sheets

(58) Field of Classification Search
CPC .. G06T 7/75; G06T 7/70; G06V 20/64; G06V 10/955; G06V 10/462; G06V 10/945; G06N 3/0464; G06N 3/08
See application file for complete search history.

(56) References Cited

U.S. PATENT DOCUMENTS

| | | | | |
|---|---|---|---|---|
| 8,994,723 | B2 | 3/2015 | Drost et al. | |
| 9,150,310 | B1 | 10/2015 | Bray et al. | |
| 10,565,731 | B1 | 2/2020 | Reddy | |
| 10,909,715 | B1 | 2/2021 | Boggs | |
| 10,929,654 | B2 | 2/2021 | Iqbal | |
| 10,937,189 | B2 | 3/2021 | Li et al. | |
| 11,254,440 | B2 | 2/2022 | Ropers | |
| 11,459,116 | B2 | 10/2022 | Kyono et al. | |
| 11,748,913 | B2 | 9/2023 | Ali et al. | |
| 11,827,203 | B2 | 11/2023 | Chakravarty et al. | |
| 11,880,503 | B1 | 1/2024 | Haentjens | |
| 12,139,271 | B2 | 11/2024 | Khosla | |
| 2007/0023575 | A1* | 2/2007 | von Thal | B64D 39/00 244/135 A |
| 2017/0073080 | A1* | 3/2017 | Hughes | B64D 39/06 |
| 2018/0173839 | A1 | 6/2018 | Fang | |
| 2018/0178924 | A1* | 6/2018 | Zomeño Rodríguez | B64D 39/04 |
| 2019/0031347 | A1* | 1/2019 | Duan | G05B 6/02 |
| 2019/0344902 | A1 | 11/2019 | Cramblitt | |
| 2019/0355150 | A1 | 11/2019 | Tremblay et al. | |
| 2019/0382126 | A1 | 12/2019 | Rix et al. | |
| 2020/0217666 | A1 | 7/2020 | Zhang | |
| 2020/0226426 | A1 | 7/2020 | Jarquin Arroyo | |
| 2021/0117661 | A1 | 4/2021 | Iqbal | |
| 2021/0304438 | A1 | 9/2021 | Ye | |
| 2021/0314551 | A1 | 10/2021 | Tang | |
| 2022/0108468 | A1 | 4/2022 | Nakamura | |
| 2022/0212811 | A1* | 7/2022 | Khosla | G06V 10/46 |
| 2022/0215571 | A1* | 7/2022 | Leach | G06T 7/70 |
| 2022/0258875 | A1* | 8/2022 | Kyono | G06V 10/82 |
| 2022/0276652 | A1 | 9/2022 | Kyono et al. | |
| 2022/0277472 | A1 | 9/2022 | Birchfield et al. | |
| 2022/0292772 | A1 | 9/2022 | Wang | |
| 2022/0306311 | A1* | 9/2022 | Kyono | G06T 7/11 |
| 2022/0413119 | A1 | 12/2022 | Starr | |
| 2022/0414911 | A1 | 12/2022 | Wang | |
| 2023/0244835 | A1 | 8/2023 | Guo | |
| 2023/0244905 | A1 | 8/2023 | Zoldi | |
| 2023/0281864 | A1 | 9/2023 | Guo | |
| 2023/0281945 | A1 | 9/2023 | Cashman | |
| 2024/0375786 | A1 | 11/2024 | Hung et al. | |
| 2024/0378744 | A1 | 11/2024 | Smith et al. | |
| 2024/0391494 | A1 | 11/2024 | Rosenblum et al. | |
| 2025/0011002 | A1 | 1/2025 | Latib et al. | |
| 2025/0022157 | A1 | 1/2025 | Latib et al. | |
| 2025/0164944 | A1 | 5/2025 | Oyama | |
| 2025/0171159 | A1 | 5/2025 | Hung et al. | |
| 2025/0173575 | A1 | 5/2025 | Hung et al. | |
| 2025/0173897 | A1 | 5/2025 | Hung et al. | |
| 2025/0173898 | A1 | 5/2025 | Hung et al. | |
| 2025/0190906 | A1 | 6/2025 | Yin | |

FOREIGN PATENT DOCUMENTS

| | | |
|---|---|---|
| EP | 4024340 | 7/2022 |
| EP | 4024346 | 7/2022 |
| WO | 2025003634 | 1/2025 |

OTHER PUBLICATIONS

Extended European Search Report for EP Patent Application No. 21205493.6 dated Mar. 31, 2022.

Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.

Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.

Soujanya, et al. "Addressing corner detection issues for machine vision based UAV aerial refueling" Machine Vision and Applications, Springer, Jan. 10, 2007, pp. 261-276, vol. 18, No. 5, Berlin, DE.

Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.

Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.

Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.

Shen, et al., "Real-Time Uncertainty Estimation in Computer Vision via Uncertainty-Aware Distribution Distillation", Computer Vision Foundation, 2021, pp. 707-716.

Peng, et al., "PVNet: Pixel-wise Voting Network for 6DoF Pose Estimation", Computer Vision Foundation, pp. 4561-4570.

Brachmann, et al., "Uncertainty-Driven 6D Pose Estimation of Objects and Scenes from a Single RGB Image", Computer Vision Foundation, pp. 3364-3372.

Rasmussen, C.E., "Gaussian Processes in Machine Learning", Max Planck Institute for Biological Cybernetics, pp. 63-71, Tubingen, Germany.

Romano, et al., "Conformalized Quantile Regression", 33rd Conference on Neural Information Processing Systems, 2019, pp. 1-11, Vancouver, Canada.

Ratzlaff, et al. "Generative Particle Variational Inference via Estimation of Functional Gradients", Proceedings of the 38 th International Conference on Machine, 2021, pp. 1-22,.

Tobin et al., "Domain Randomization for Transferring Deep Neural Networks from Simulation to the Real World", https://arxiv.org/pdf/1703.06907.pdf, accessed Dec. 5, 2023, pp. 1-8.

Mehta, et al. "Active Domain Randomization", https://arxiv.org/pdf/1904.04762.pdf, accessed Dec. 5, 2023, pp. 1-15.

Akkaya. et al., "Solving Rubik's Cube With a Robot Hand", https://arxiv.org/pdf/1910.07113.pdf, accessed Dec. 5, 2023, pp. 1-51.

Extended European Search Report for EP Patent Application No. 24200751.6 dated Mar. 7, 2025.

Dementhon, et al., Model-Based Object Pose in 25 Lines of Code, pp. 1-9.

Extended European Search Report for EP Patent Application No. 24196940.1 dated Mar. 7, 2025.

Wang et al., Revisiting Monocular Satellite Pose Estimation With Transformer, IEEE Transactions on Aerospace and Electronic Systems, Oct. 2022, pp. 4279-4294, vol. 58, No. 5.

Chen et al., Satellite Pose Estimation with Deep Landmark Regression and Nonlinear Pose Refinement, Computer Vision Foundation, 2019, pp. 1-9.

Quang et al., Monocular Vision and Machine Learning for Pose Estimation, 2023, pp. 128-136.

Extended European Search Report for EP Patent Application No. 24196935.1 dated Feb. 6, 2025.

Shi et al., Fast Uncertainty Quantification for Deep Object Pose Estimation, IEEE International Conference on Robotics and Automation, May 2021, pp. 5200-5207.

Vaghi et al., A Comparison of Uncertainty Estimation Approaches for DNN-based Camera Localization, Nov. 2022, pp. 1-7.

Extended European Search Report for EP Patent Application No. 24165111.6 dated Jul. 10, 2024.

Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.

(56) References Cited

OTHER PUBLICATIONS

Extended European Search Report for EP Patent Application No. 24192391.1 dated Jan. 24, 2025, pp. 1-13.
Extended European Search Report for EP Patent Application No. 24192395.2 dated Jan. 24, 2025, pp. 1-12.
Li et al., Deep Supervision with Intermediate Concepts, IEEE Transactions on Pattern Analysis and Machine Intelligence, Aug. 2019, pp. 1828-1843, vol. 41, No. 8.
Reddy et al,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.
Park et al., Robust multi-task learning and online refinement for spacecraft pose estimation across domain gap, 2023, pp. 1-15, Advances in Space Research.
Gong et al., Research of an Unmanned Aerial Vehicle Autonomous Aerial Refueling Docking Method Based on Binocular Vision, 2023, pp. 1-21, 7, 433.
Morreale et al., Neural Semantic Surface Maps, Sep. 9, 2023, pp. 1-15,.
Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.
Extended European Search Report for EP Patent Application No. 24171550.7 dated Oct. 16, 2024, pp. 1-13.
Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.
Klein, et al., "Uncertainty in Data-Driven Kalman Filtering for Partially Known State-Space Models", ICASSP 2022—2022 IEEE International Conference on Acoustics, Speech, and Signal Processing (ICASSP), IEEE, May 23, 2022, pp. 3194-3198.
Shi, et al., "Fast Uncertainty Quantification for Deep Object Pose Estimation", Arvix.org, Cornell University Library, Nov. 16, 2020, pp. 1-8.
Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.
Extended European Search Report for EP Patent Application No. 24182647.8 dated Oct. 24, 2024, pp. 1-7.
Extended European Search Report for EP Patent Application No. 24183945.5 dated Nov. 20, 2024, pp. 1-8.
Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.
Thomas, et al., "Advances in air to air refuelling", Progress in Aerospace Sciences, vol. 71, Jul. 28, 2014, pp. 14-35.
Zhao, et al., "Estimating 6D Pose From Localizing Designated Surface Keypoints", https://arxiv.org/pdf/1812.01387.pdf, accessed Dec. 5, 2023, pp. 1-9.
Xiao et al., "Simple Baselines for Human Pose Estimation and Tracking", https://arxiv.org/pdf/1804.06208.pdf, accessed Dec. 5, 2023, pp. 1-9.
Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.
Lee, et al., "Camera-to-Robot Pose Estimation from a Single Image", 2020 IEEE International Conference on Robotics and Automation (ICRA), 2020, pp. 9426-9432, Paris, France.
Bashir, et al., "Small Object Detection in Remote Sensing Images with Residual Feature Aggregation-Based Super-Resolution and Object Detector Network", Remote Sens., 2021, 13, 1854, pp. 1-21.
Unel, et al., "The Power of Tiling for Small Object Detection", Computer Vision Foundation, pp. 1-10.
Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.
Zhang, et al., "A Flexible Online Camera Calibration Using Line Segments", Journal of Sensors, 2016, vol. 2016, Article ID 2802343, pp. 1-17, Hindawi Publishing Corporation.
Liu et al., Simple and Principled Uncertainty Estimation with Deterministic Deep Learning via Distance Awareness, 34th Conference on Neural Information Processing Systems, 2020, pp. 1-15, Vancouver, CA.
Guo et al., On Calibration of Modern Neural Networks, Proceedings of the 34th International Conference on Machine Learning, Aug. 3, 2017, pp. 1-14, Sydney, Australia.
Pavlakos, et al., 6-DoF Object Pose from Semantic Keypoints, 2017 IEEE Internation Conference on Robotics and Automation, pp. 1-8.
Parsons et al., Analysis of Simulated Imagery for Real-Time Vision-Based Automate Aerial Refueling, Journal of Aerospace Information Systems, Mar. 2019, pp. 77-93, vol. 16, No. 3.
Newell et al., Stacked Hourglass Networks for Human Pose Estimation, Jul. 2016, pp. 1-17, article obtain from https://arxiv.org/pdf/1603.06937 Sep. 16, 2025.
Fu, et al. "The 60 pose estimation of the aircraft using geometric property." IEEE Transactions on Circuits and Systems for Video Technology, Jul. 2023, pp. 3358-3368, vol. 33, No. 7.
Hashemi, M., "Enlarging smaller images before inputting into convolutional neural network: zero-padding vs. interpolation." Journal of Big Data, 2019, pp. 1-13.
Saponara, et al. Impact o Image Resizing on Deep Learning Detectors for Training Time and Model Performance, Department of Information Engineering, University of Pisa, Italy, 2022, pp. 10-17.
EP Office Action for EP Patent Application No. 24182647.8 dated Mar. 17, 2026.
Hao et al., Scale-unambiguous relative pose estimation of space uncooperative targets based on the fusion of three-dimensional time-of-flight camera and monocular camera, Optical Engineering, May 2015, pp. 1-12, vol. 54(5).
Oksuz et al., "Imbalance Problems in Object Detection: A Review," Mar. 11, 2020, accessed https://arxiv.org/abs/1909.00169 on Jul. 14, 2026.
Dao et al., "Imbalance Problems in Object Detection: A Review," Mar. 11, 2020, accessed https://arxiv.org/pdf/1803.06084 on Jul. 14, 2026.

* cited by examiner

SYSTEMS AND METHODS FOR CALCULATING REFUELING TANKER BOOM 3D POSITION FOR AERIAL REFUELING

FIELD

This disclosure relates generally to aerial refueling, and more particularly to controlling aerial refueling operation.

BACKGROUND

Cameras provide information for aerial refueling operations. However, accurately and efficiently conducting a refueling operation using cameras can be difficult when practicing current techniques.

SUMMARY

The subject matter of the present application has been developed in response to the present state of the art, and in particular, in response to the shortcomings of conventional aerial refueling techniques, that have not yet been fully solved by currently available techniques. Accordingly, the subject matter of the present application has been developed to provide systems and methods for providing aerial refueling techniques that overcome at least some of the above-discussed shortcomings of prior art techniques.

The following is a non-exhaustive list of examples, which may or may not be claimed, of the subject matter, disclosed herein.

In one example, a method includes receiving a two-dimensional (2D) image from a camera, which can be a single camera, of a tanker aircraft, determining 2D keypoints of a refueling boom located within the 2D image based on a predefined point model of the refueling boom, determining a 6 degree-of-freedom (6DOF) pose using the 2D keypoints and the corresponding three-dimensional (3D) space 3D keypoints, optimizing 3D keypoints associated with moveable components of the refueling boom in response to a plurality of boom control parameters to produce optimized 3D keypoints, and estimating a position of the refueling boom based on the 6DOF pose and the optimized 3D keypoints In another example, a tanker aircraft includes a camera (which can be a single camera), a refueling boom, a camera configured to generate a two-dimensional (2D) image of the refueling boom, a processor, and non-transitory computer readable storage media storing code. The code is executable by the processor to perform operations including receiving the 2D image from the camera, determining 2D keypoints of the refueling boom located within the 2D image based on a predefined point model of the refueling boom, determining a 6 degree-of-freedom (6DOF) pose using the 2D keypoints and the corresponding three-dimensional (3D) space 3D keypoints, optimizing 3D keypoints associated with moveable components of the refueling boom in response to a plurality of boom control parameters to produce optimized 3D keypoints, and estimating a position of a tip of the refueling boom based on the 6DOF pose.

In still another example, a refueling system includes a processor and non-transitory computer readable storage media storing code. The code being executable by the processor to perform operations including receiving a two-dimensional (2D) image from a camera (which can be a single camera), determining 2D keypoints of a refueling boom located within the 2D image based on a predefined point model of the refueling boom, determining a 6 degree-of-freedom (6DOF) pose using the 2D keypoints and corresponding 3D keypoints, optimizing 3D keypoints associated with moveable components of the refueling boom in response to a plurality of boom control parameters to produce optimized 3D keypoints, and estimating a position of a tip of the refueling boom based on the 6DOF pose.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a refueling system 102 located on a tanker aircraft 100 that tracks a refueling boom and boom tip of a tanker aircraft by utilizing control sensors, three-dimensional (3D) digital models, and images to estimate where the boom and boom tip are in space. This tracked information may be used for autonomous control purposes or visual guidance during the refueling process.

Figure 1:
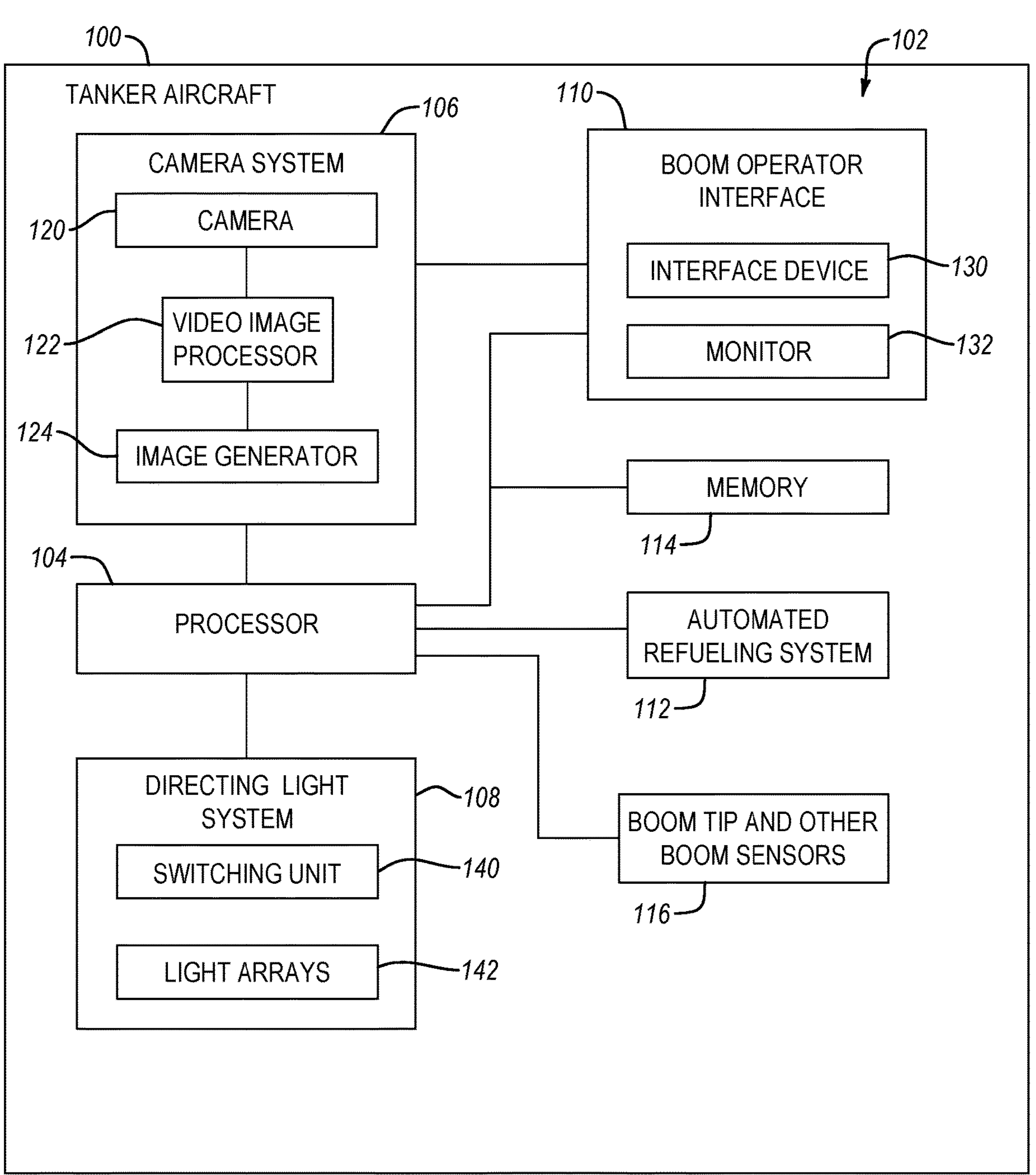
FIG. 1 is a schematic block diagram of a tanker aircraft with an automated director light and refueling system, according to one or more examples of the present disclosure.
Figure 2:
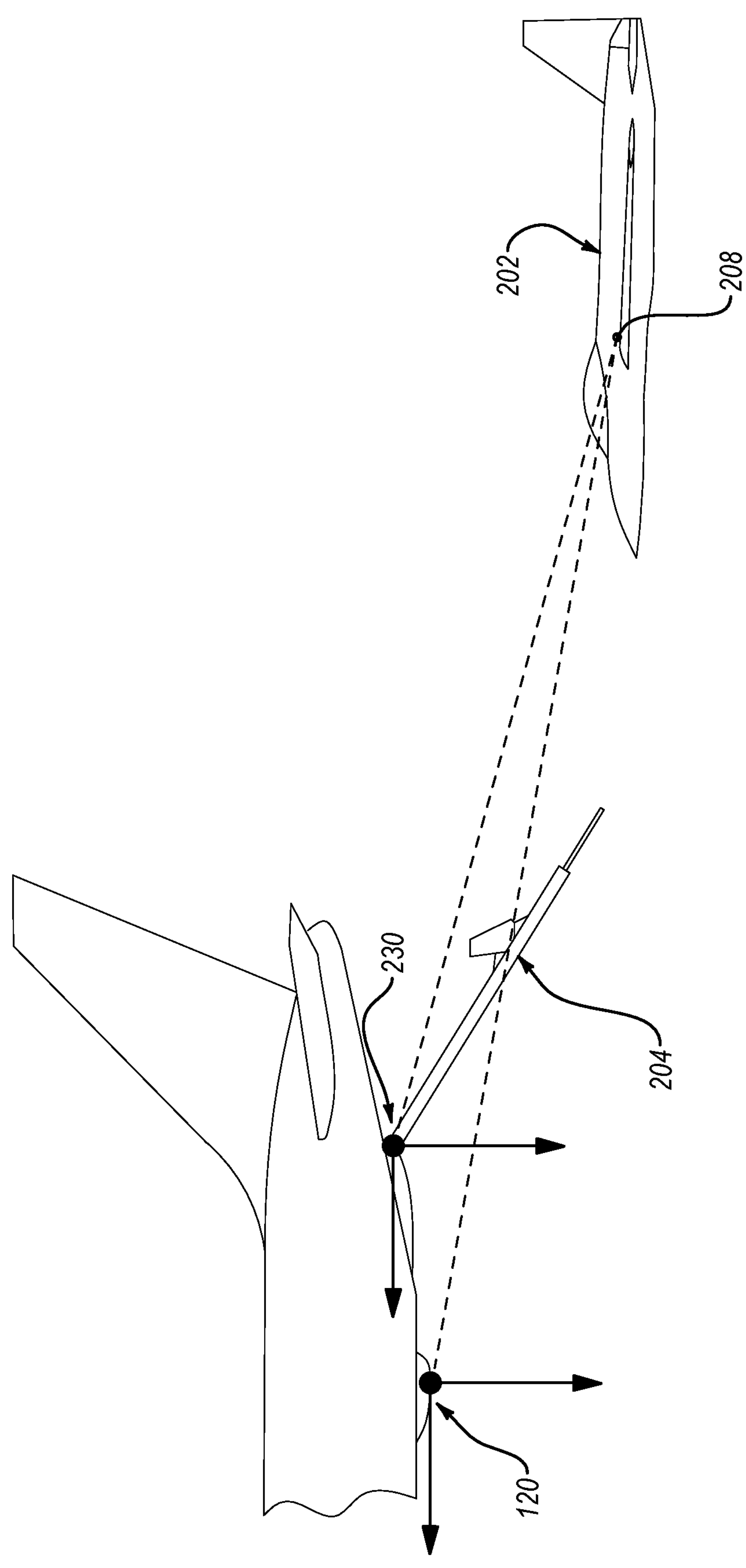
FIG. 2 is a schematic, side elevation view of an aircraft refueling operation, according to one or more examples of the present disclosure.

As shown in FIGS. 1 and 2, the refueling system 102 includes a processor 104, a camera system 106, a director light system 108 (e.g., directing light system), a boom operator interface 110, an automated refueling system 112, a boom tip and other sensors 116, and memory 114.

In various embodiments, the camera system 106 includes a camera 120, a video image processor 122, and an image generator 124. The camera 120 is mounted approximately to a fixed platform within a fared housing attached to the lower aft fuselage of the tanker aircraft 100. The camera 120 includes a lens or lenses having remotely operated focus and zoom capability. The camera 120 is located in an aft position relative to and below the tanker aircraft 100. The video image processor 122 receives digitized video images from the camera 120 and generates real-time 2D video images. The digitized video images include the objects viewed by the camera 120 within a vision cone, specifically, the boom 204 and the receiver aircraft 202. The image generator 124 then generates images for presentation on the boom operator's monitor 132.

Figure 3:
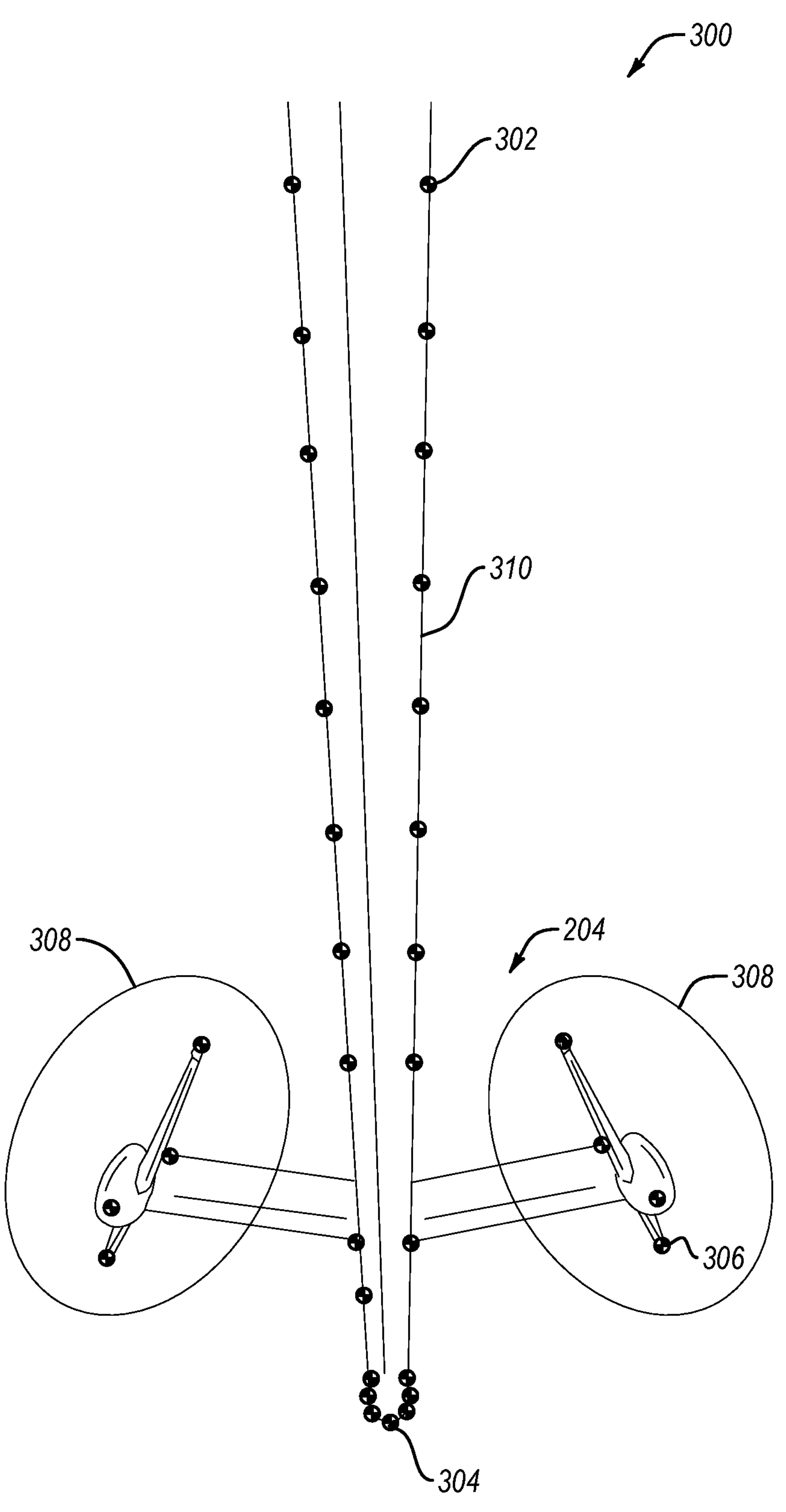
FIG. 3 is a representation of an image, generated by a camera on a tanker aircraft, of a refueling boom, according to one or more examples of the present disclosure.

Referring to FIG. 3, the camera system 106 produces a two-dimensional (2D) image 300 of a 3D space including at least a deployed refueling boom 204 and may also include a receiver aircraft 202. The 2D image 300 includes an approach zone the receiver aircraft 202 enters into prior to beginning refueling operations. The receiver aircraft 202 includes a boom nozzle receiver 208 capable of coupling to the refueling boom 204 in order to accomplish fuel transfer.

In various embodiments, the boom operator interface 110 includes a user interface device 130 and a monitor 132. Images presented on the monitor 132 are based on information provided by the processor 104. The director light system 108 includes a switching unit 140 and an array of lights 142 (i.e., pilot director lights). The switching unit 140 controls activation of the array of lights 142 based on information provided by the processor 104. The automated refueling system 112 controls operation of the refueling boom 204 and/or the tanker aircraft 100 based on information provided by the processor 104.

It can be appreciated that refueling or close quarter operations may occur between other vehicles not just the aircraft 100, 202 depicted. The refueling or close quarter operations may occur during adverse weather conditions. The vehicles may be any vehicles that move relative to each other (in water, on land, in air, or in space). The vehicles may also be manned or unmanned. Given by way of non-limiting example, in various embodiments, the vehicles may be a motor vehicle driven by wheels and/or tracks, such as, without limitation, an automobile, a truck, a cargo van, and the like. Given by way of further non-limiting examples, in various embodiments, the vehicles may include a marine vessel such as, without limitation, a boat, a ship, a submarine, a submersible, an autonomous underwater vehicle (AUV), and the like. Given by way of further non-limiting examples, in various embodiments, the vehicles may include other manned or unmanned aircraft such as, without limitation, a fixed wing aircraft, a rotary wing aircraft, and a lighter-than-air (LTA) craft.

In various embodiments, the array of lights 142 is located on the lower forward fuselage of the tanker aircraft 100. The array of lights 142 is positioned to be clearly viewable by the pilot of the receiver aircraft 202. Moreover, the array of lights 142 includes various lights for providing directional information to the pilot of the receiver aircraft 202. The array of lights 142 may include an approach light bar, an elevation light bar, a fore/aft position light bar, four longitudinal reflectors, two lateral reflectors, or other lights.

In various embodiments, non-transitory computer readable instructions (i.e., code) stored in the memory 114 (i.e., storage media) cause the processor 104 to use raw image data from a single sensor (i.e., the camera 120) and make the raw data scalable and cost effective to integrate into existing systems. In particular, the processor 104 predicts keypoints 302, 304 (see, e.g., FIG. 3) of the refueling boom 204 within the 2D image 300. The keypoints 302 are referenced in 2D space. The prediction is based on a trained deep neural network configured to estimate the pixel location of the keypoints of the refueling boom 204 in the 2D image 300. The processor 104 then performs 2D-to-3D correspondence, using a 3D point matching algorithm. The perspective-n-point (PnP) pose computation solves for the 6 degree-of-freedom (6DOF) parameters (the 3D translation and rotation) through optimization given the following: (1) the 2D predicted keypoints 302 from the neural network, (2) the 3D corresponding keypoints from the 3D model, and (3) the camera intrinsic "K" matrix and distortion (these determine how the 3D world is projected onto the 2D image). In another embodiment, an optimization process iteratively tries different 6DOF solutions until reprojection error is minimized (this is the difference between (1) above and the projection of (2) onto the image using the camera parameters of (3)). The iterative optimization also positions the moveable parts (e.g., elevators and rudders FIG. 3) of the refueling boom 204 based on boom control parameters. In various embodiments, a method more accurately estimates the 6DOF poses of all components of a mechanism (e.g., the refueling boom 204). This process is done through visual observation from a camera, and does not rely on sensor readings of component controls.

Then, a boom tip 6DOF position (i.e., pose) is determined using a boom tip extension value received from the boom tip sensor 116 and the predicted boom 6DOF pose or using a deep learning algorithm coupled with raytracing from the camera 120 in addition to the predicted boom 6DOF pose.

In various embodiments, four example methodologies/solutions are provided for estimating relative position of the boom tip. The methodologies/solutions include: (1) raytracing with 6DOF; (2) boom tip extension value with 6DOF; (3) perform methodology/solution (1) with realistic poses that the boom can be in; and (4) perform methodology/solution (2) with realistic poses that the boom can be in.

In various embodiments, the processor 104 performs object bounding box detection, keypoint detection, 6DOF pose estimation, and boom tip 6DOF pose estimation.

Bounding Box Detection

In various embodiments, the processor 104 generates a bounding box around an area of interest within the 2D image 300 produced by the camera 120. The area of interest is an area where the refueling boom 204 is most likely located based on knowledge of refueling boom dimensions and where the camera 120 is pointing. The knowledge of refueling boom dimensions may include information from boom sensors including a boom tip sensor 116 that can identify boom positions, such as that shown in FIGS. 4-6. The bounding box minimizes the amount of unnecessary features within the 2D image 300 that would be analyzed by the processor 104. The bounding box is initially determined using information from sensors associated with the refueling boom 204. Using these sensors and an object file of the refueling boom 204, the processor 104 estimates position and orientation of a 3D virtual model of the refueling boom 204 in 3D space. The estimated 3D model is then projected onto a virtual camera's image in 2D space to produce a projected virtual boom. Then, a bounding box is made around the pixels that contain the projected virtual boom. The bounding box includes a buffer so as to include more of the image in case the projected virtual boom does not match the real world.

Additionally, after some time has passed and the refueling boom 204 is being tracked efficiently, the bounding box can be made using only the estimated position and orientation (i.e., the 6DoF parameters of the boom). The tanker's sensors of the boom are initially used because there is no initial estimation of where the boom is in 3D space or 2D space. Once the estimations and trackers start, the tracked 6DOF parameters of the boom can be used to feed back into the bounding box process.

Keypoint Detection

In various embodiments, the processor 104 identifies the keypoints 302 of a main body 310 of the boom 204 and keypoints 306 of the moveable components 308 on the boom 204 as imaged by the camera. Prior to the processor 104 identifying the keypoints 302, 306, a convolutional neural network (CNN) is trained to identify features/keypoints on the 3D virtual/digital model from a 2D image. The CNN is based on residual network (ResNet) architecture. The CNN removes final pooling and fully connected layers of the architecture and replaces them with a series of deconvolutional or upsampling layers to return an output image matching the height and width of the input image with the number of keypoints matching the number of channels. Each of the channels is considered to be a heatmap of where the keypoint is located in 2D image space. From the heatmap, the pixel at the center of the distribution represented by the heatmap is chosen to be the position of the keypoint (i.e., the 2D keypoint predictions).

In various embodiments, during training of the CNN, the CNN takes as input an image, or in our case the rescaled bounding box crop of a video frame and returns as output a black and white heatmap image for each keypoint. The heatmaps' pixel values indicate for each keypoint the likelihood of the 3D virtual object's keypoint being found at each pixel location of the image once the object has been projected onto the image. To train the weights of the CNN, ground truth heatmaps are constructed from ground truth 2D pixel locations. The pixel values of ground truth heatmaps are assigned the values of a Gaussian probability distribution over 2D coordinates with mean equal to the ground truth 2D pixel location and covariance left as a hyperparameter for training. The loss that is minimized during training is composed of the Jensen-Shannon divergence between the CNN's heatmap outputs and the ground truth heatmaps and the Euclidean norm between the CNN's 2D keypoint estimates and the ground truth 2D keypoints.

In various embodiments, training of the CNN uses a domain randomization (DR) process in which several 3D augmentations are performed along with 2D augmentations. The 3D augmentations done are randomly chosen boom positions and orientations, along with random materials and coatings of the object and random positioning and intensity of lighting. The 2D augmentations performed random dropouts of the image, blurring, lighting and contrast changing. By adjusting all of these 3D and 2D parameters, a wide array of views of what the boom could look like in different positions, materials, and lightings are attained.

Referring to FIG. 3, in one example, thirty-seven boom keypoints (KPs)+one boom tip KP (thirty-eight KPs total) are determined. First keypoints 302 are fixed/static and are used for solving PnP. Second keypoints 304, 306 are located on parts of the boom that can move and may not be used in PnP. A boom tip may be included as a keypoint for 3D boom tip estimation, but it is not used in the PnP solution for boom 6DOF estimation.

6DOF Pose Estimation

The processor 104 turns 2D keypoint predictions into 6DOF estimations. A first method uses only the PnP algorithm and a second method solves for PnP and then a control fitting algorithm. Because both methods use PnP, they leverage the correspondences between the 2D pixel locations of detected keypoints and 3D keypoint locations on an object model to rotate and position the object in space such that the camera's view of the 3D keypoints matches the 2D pixel locations. In various embodiments, a random sample consensus (RANSAC) PnP algorithm (e.g., OpenCV) is used.

The control fitting algorithm receives the PnP 6DOF solution and does further optimization to find a physically feasible 6DOF solution (i.e., realistic pose) considering the fixed point 230 between the boom and the tanker. Inverse calculations are used to convert the 6DOF solution to the estimated input boom control parameters using a robotic model, camera to boom extrinsics, and trigonometry. Once the control parameters are estimated, a least squares fit is used to optimize over the most likely set of input control parameters. From there a Kalman filter is used to help smooth the results.

The inverse calculations, in general, depend on the kinematics of a robotic arm. In this case, the robotic arm is the boom. To derive the kinematic equations to describe the movement of the boom, there are 4 boom control parameters (2 for pitch, 1 for roll, and 1 for telescopic extension). The first three are revolute joints, and the last is a prismatic joint. The kinematics of these joints are guided by 3D transforms (hence the "camera to boom" extrinsics and "trigonometry") to describe how 3D points along the boom are transformed in 3D space as the boom control parameters are changed. This is what is called the forward calculation of the kinematics. The inverse calculation is therefore trying to solve for the boom control parameters that give a certain 3D keypoint projection in a 2D image.

There is a way to project 3D points on the boom onto the 2D image based on the boom control parameters (forward calculation), and a way to recover the boom control parameters based on the projected 3D points (inverse calculation). These calculations are used in a control fitting algorithm. The control fitting algorithm tries to update the 6DOF boom pose solution from PnP so that it is physically realizable. Because the boom is fixed to the tanker, it can only move in certain ways based on its kinematics. This limits the set of 6DOF poses that the boom can be in. In addition, PnP operates on a rigid 3D object and cannot optimally account for 3D points on movable components of the boom. The control fitting algorithm also relieves this limitation by updating the movable components of the boom to match their configuration in the 2D image. PnP does not take into account these limitations, so the point of the control algorithm of the present disclosure is to account for these limitations in order to produce a more accurate 6DOF pose answer. In one example, the control algorithm iteratively solves, via least squares optimization, for a set of boom control parameters that minimizes the error between the 2D predicted keypoints from the neural network and the projected keypoints from a physically possible set of boom control parameters. The initial condition of the optimization is the 6DOF pose solution from PnP.

In various embodiments, a method uses boom kinematics with multiple components to build an optimization objective that is a function of the boom control parameters. In various embodiments, the optimization uses the fact that the boom is fixed at a certain point and removes any additional degrees of freedom that arise if the boom fixed point were unconstrained. The angle(s) of the movable components 308 are estimated in space via the optimization and used to compute a refinement over the 6DoF pose estimated from PnP. This refinement in accuracy follows from accounting for the full kinematic model. The full model allows more keypoints-particularly those on the movable components to be considered and allows analytical jacobian based optimization methods to be used.

Boom Tip Position Estimation

In various embodiments, the processor 104 determines the 3D position of the boom tip after the processor 104 uses the 6DOF of the boom, described above. Because the boom tip is only one point, performing PnP solely on the boom tip may not be possible. PnP needs multiple points to be effective. The following are two methods to find the 3D position of the boom tip.

Sensor Extension Method

A default boom tip 3D position in model space is adjusted by a boom extension parameter produced by the boom tip sensor 116. This extended boom tip 3D position is then rotated and translated based on the coordinate transform of the predicted boom 6DOF.

Raytracing Method

In various embodiments, the processor 104 receives the 6DOF estimations and additional calculations using the 2D keypoint predictions. The boom tip is one of the 2D keypoints. The 2D boom tip is used as the basis for projecting a plane from the origin of the camera 120 out into space to find the 3D boom tip estimate (point), which is the intersection of the camera origin plane and the boom telescope ray. In various embodiments, several keypoints 302 found from the CNN are used to determine the orientation of the camera origin plane. The slope of the 2D keypoints 302 is found and is used to determine the slope of the camera origin plane. The boom tip, along with another arbitrary point in 2D on the camera origin plane, are found in 3D at some arbitrary distance using the inverse camera projection. These 3D points, along with the origin of the camera 120, parameterize the camera origin plane in 3D. Using the 6DOF estimations, boom orientation and position in space are known. The processor 104 then finds an intersection point of a vector/ray which extends from the boom and the camera origin plane coming from the camera origin. The intersection point is the 3D position estimate of the boom tip. The 3D position of the boom tip produced by the raytracing method or the extension method is used for automatically sending instructions to a receiver aircraft or a boom operator system or automatically controlling an automated refueling system.

Figure 4:
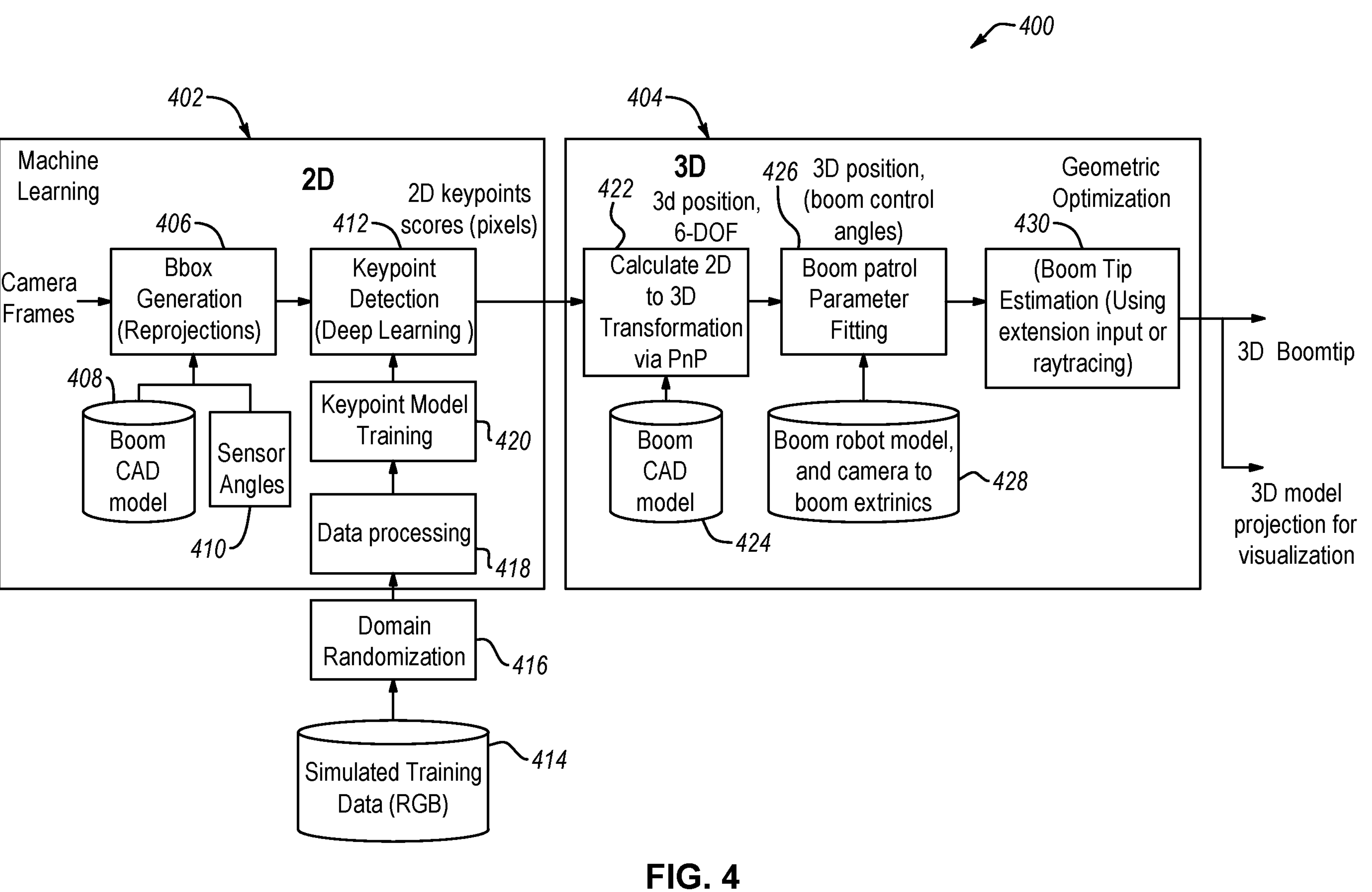
FIG. 4 is a schematic flow diagram of a method of determining boom tip location, according to one or more examples of the present disclosure.

Referring to FIG. 4, a method 400 includes a 2D keypoint machine learning method 402 and a geometric optimization method 404. A block 406 of the 2D keypoint machine learning method 402 includes generating a boundary box using boom computer aided design (CAD) model (i.e., digital model) information from a database 408 and boom control angle values sensed by a boom sensor(s) 410. A block 412 of the 2D keypoint machine learning method 402 includes detecting keypoints using a deep learning neural network based on simulated training data (RGB image data) 414, domain randomization 416, data preprocessing 418, and keypoint model training 420. Data preprocessing 418 includes normalizing data samples by the mean and standard deviation of an entire inputted dataset, reorganizing channels of the data to a format typical for neural networks (e.g., number of images in a batch, number of channels, height of image, width of image), moving the data from CPU cache onto the GPU, etc. In the geometric optimization method 404, a block 422 includes calculating a 2D to 3D transformation using PnP and the boom CAD (digital) model 424. A block 426 of the geometric optimization method 404 includes boom parameter control fitting using a stored boom robot model and camera to boom extrinsics 428. The block 426 is where the initial pose guess from the block 422 is further optimized to get a realistic pose (i.e., boom is fixed to the tanker and is within the set of poses physically attainable by the boom robot model, i.e., the kinematics of the boom). The block 426 also performs iterative optimization of position of the boom moveable components based on a boom kinematics (robot) model. The boom kinematics model includes controls, each having minimum and maximum angle constraints as described in more detail below. A block 430 of the geometric optimization method 404 includes performing optional data smoothing, such as via a Kalman filter.

Figures 5, 6:
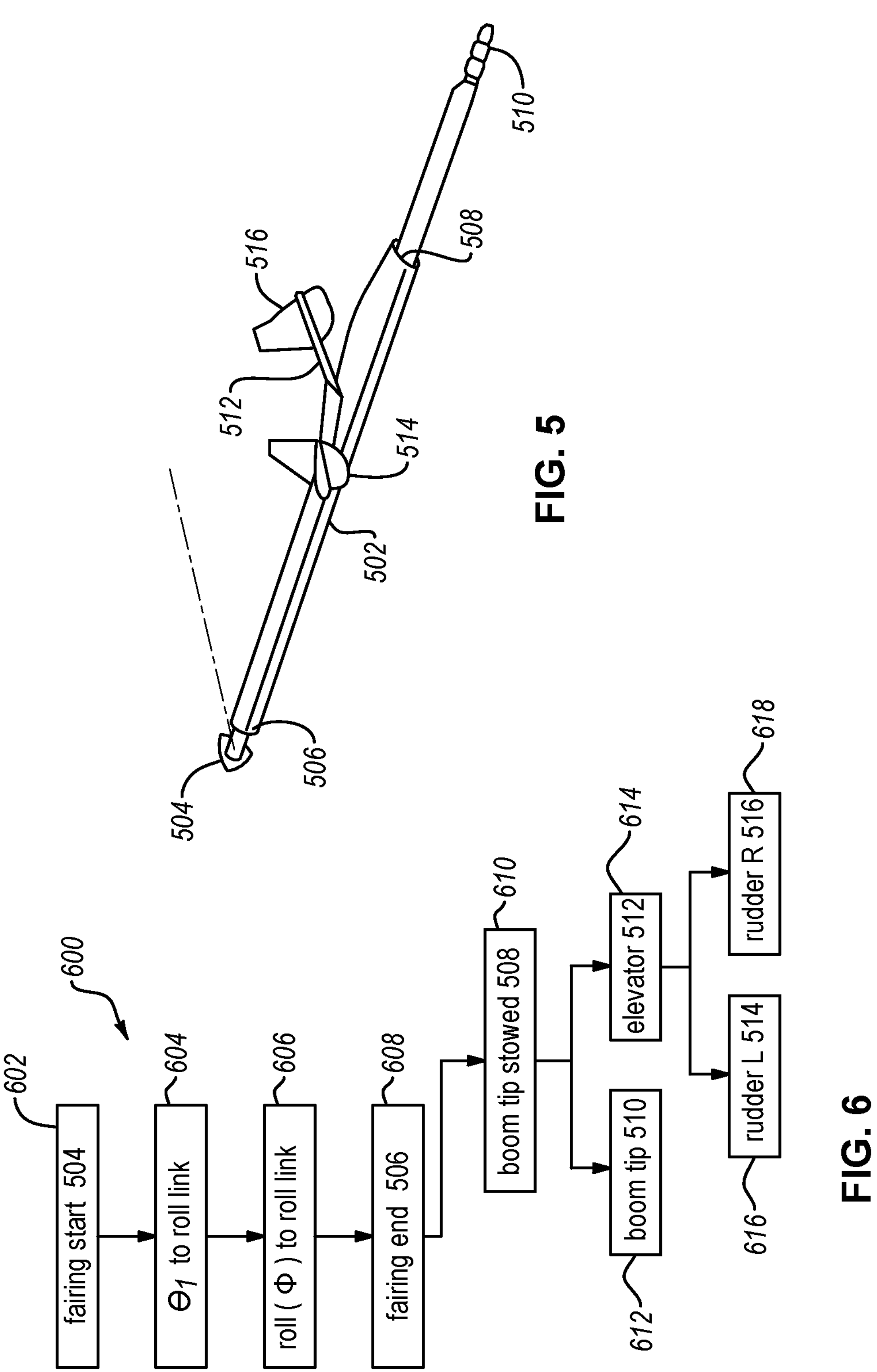
FIG. 5 is a schematic of a perspective view of refueling boom and moveable components therein, according to one or more examples of the present disclosure.
FIG. 6 is a schematic flow of angular values from FIG. 5 and how they correlate, according to one or more examples of the present disclosure.

Referring to FIG. 5, a large visible portion of the boom's geometry is composed of movable components with angular relationships. FIG. 5 shows a boom having a fixed point A with an aircraft (not shown). The boom includes moveable parts-elevator 512, left rudder 514, right rudder 516, and a boom tip 510 that have angular or distance relationships with a main shaft 502 of the boom. The proximal end 506 of the main shaft 502 is connected to the aircraft at a fairing start 504 The distal end of the main shaft 502 defines a stowed position 508 of the boom tip 510 when the boom tip 510 is stowed. FIG. 6 shows a flow diagram 600 of how the parts of the boom structurally relate to each other. This structural relationship may be realized in a matrix as will be described below.

By accounting for movements, more 2D pixel space point correspondences which track the features on this extra geometry are leveraged to provide less pose ambiguity and more estimation robustness when using points that are further spread out in 3D space. According to the boom kinematics model, each control has a minimum and maximum angle constraint, so modeling the boom pose this way also allows for constrained iterative optimization of the boom pose. Additionally, a more subtle advantage is that the boom internal roll and pitch controls apply to disconnected roll and pitch axes. Motion of the boom may be tracked using control parameters, which allow more precise constraints on the possible movement speeds of the components. The boom kinematics model can represent the true degrees of freedom of the boom, whereas a standard 6DOF pose is limited to represent orientation as an unconstrained 3D rotation about a single pivot point. The use of the control parameters to represent boom pose allows the tracker to follow the motion constraints that would occur along the separated roll and pitch axes and eliminate a redundant yaw along the boom's main axis as an unnecessary degree of freedom.

In various embodiments, boom control parameters (such as rudder angles, elevator angle, main pitch angle ($\theta_1$), main roll angle ($\phi$) are mapped to the 2D pixel coordinates of keypoints that would be seen by a camera with known parameters (such as focal length, position, orientation). Thus, standard iterative solvers may be used to optimize over control parameters and find the values which map to the 2D pixel coordinates that are as close to the 2D keypoints predicted by a computer vision method in each image.

In various embodiments, a function, mapping control parameter values to 2D pixel coordinates, is made from the boom kinematics model and camera projection. The boom kinematics model breaks up the non-rigid 3D model of the boom into components which are individually rigid 3D objects, but connected to one another through joints that may move. FIG. 6 details where in 3D space each component is attached to another and what axes the component moves by. According to the boom kinematics model, a function mapping the boom control parameters to the pose of each component can be represented as a series of 4×4 matrix multiplies, each representing a single rotation followed by translation. Each block in FIG. 6. is represented by a separate rigid 3D model, and each arrow connecting blocks is represented by a 4×4 matrix. Each rigid 3D model has its own internal coordinate space, and in order to convert between coordinate spaces of two connected blocks, points in one coordinate space are multiplied by the connecting arrow's 4×4 matrix. Some of the matrixes contain only static values, computed once based on the boom's designs. Most are dynamic and contain entries which are re-computed based on the input control parameters. Multiplying matrixes together following the arrows in FIG. 6 has a cumulative effect and can be used to calculate the conversion from a given component's internal 3D coordinate space all the way into the full boom model's 3D space. So, for a given 3D keypoint, applying the full chain of matrix multiplications from the start of the fairing at block 602 to the component containing the keypoint (one of blocks 604, 606, 608, 610, 612, 614, 616, 618) will calculate the 3D keypoint's resulting position in 3D space. Different chains of matrix multiplications will be applied to different keypoints depending on how far down the chain they fall and if there is a fork in the chain leading to them, but the chain can be used to group keypoints on the same component and associate them to the same matrix multiplications for efficient computation. Once the 3D positions of the individual keypoints are calculated, the full set of points is grouped together, and the full set of 3D points can be projected to 2D pixel space using a standard mathematical model of camera projection. Altogether, these operations form the function mapping control parameters to the corresponding appearance of 2D keypoints in pixel coordinates. Unless otherwise stated as "fixed", each arrow in FIG. 6 represents a movable joint-so for example, "elevator axis" has a control parameter affiliated with it, even though there's no greek letter.

In order to estimate control parameters from a given image, an optimizer is used to minimize the average Euclidean distance between the 2D keypoints perceived by a computer vision method and the 2D keypoints that result from a given set of boom control parameters.

The objective function from control parameters to the Euclidean distance error for the full set of keypoints is differentiable, so the full gradient with respect to the control parameters can be calculated using the chain rule. Off the shelf optimizers-particularly ones using analytical derivatives can be used. The optimizer repeatedly evaluates the Euclidean distance and gradient calculations at different control parameters in order to iteratively refine a set of control parameters to optimal values. Additionally, specific keypoint pairs' distance components may be set to zero and excluded from the optimization objective, this removes their contribution to the control parameter estimate. If the system can report that certain 2D point estimates are unreliable, using a confidence or uncertainty score, then those keypoints may be omitted. Also, if the 3D model's projected pixel coordinates for a certain keypoint fall off the bounds of the image, then, it can also be ignored.

In various embodiments, the optimizer is an iterative optimizer, for example SciPy Library's L-BFGS-B optimizer. The optimizer may include a tunable maximum iteration count and/or solution tolerance. These values ensure that the iterations finish in bounded time or optionally stop early when successive solutions converge give a tolerance value. The optimizer may require an initial value. For initial values that are close to optimal, the optimizer may reach tolerance sooner and run faster. It is beneficial to calculate a coarse estimate of the boom control parameters to use as initial values. In an offline usage, or before a tracker is initialized, a rigid body 6DOF pose estimate can be used to calculate initial values of the boom main body pitch and roll control parameters.

In various embodiments, OpenCV's PnP RANSAC solver may be used. For further robustness, the optimizer also allows estimation bounds to be specified, allowing the boom controls' minimum and maximum ranges to constrain results.

In various embodiments, the solution described above may be applied outside of the boom operation environment, such as in robotics or manufacturing. Accurate pose estimation of objects may be used for automated grasping and manipulation. Accurate pose estimation of objects may be used for calibration of cameras/robotic system extrinsic.

The following is a non-exhaustive list of examples, which may or may not be claimed, of the subject matter, disclosed herein.

The following portion of this paragraph delineates example 1 of the subject matter, disclosed herein. According to example 1, a method includes receiving a 2D image from a camera of a tanker aircraft, determining 2D keypoints of a refueling boom located within the 2D image based on a predefined point model of the refueling boom, determining a 6DOF pose using the 2D keypoints and corresponding 3D keypoints, and estimating a position of a tip of the refueling boom based on the 6DOF pose.

The following portion of this paragraph delineates example 2 of the subject matter, disclosed herein. According to example 2, which encompasses example 1, above, determining the 6DOF pose comprises performing a perspective-n-point algorithm using the 2D keypoints and the 3D keypoints to produce the 6DOF pose.

The following portion of this paragraph delineates example 3 of the subject matter, disclosed herein. According to example 3, which encompasses any of examples 1 or 2, above, estimating the position of the tip of the refueling boom comprises receiving a boom tip extension value and estimating the position of the tip of the refueling boom based on the boom tip extension value.

The following portion of this paragraph delineates example 4 of the subject matter, disclosed herein. According to example 4, which encompasses any of examples 1-3, above, estimating the position of the tip of the refueling boom comprises receiving a raytracing value of the tip of the refueling boom and estimating the position of the tip of the refueling boom based on the raytracing value.

The following portion of this paragraph delineates example 5 of the subject matter, disclosed herein. According to example 5, which encompasses example 4, above, receiving the raytracing value comprises identifying a boom tip key point within the 2D image, producing a 3D boom tip key point based on the boom tip key point, identifying a horizontal plane between the camera and the 3D boom tip key point, and generating the raytracing value by identifying an intersection of a longitudinal boom axis and the horizontal plane.

The following portion of this paragraph delineates example 6 of the subject matter, disclosed herein. According to example 6, which encompasses any of examples 1-5, above, the method further includes sending the position of the tip of the refueling boom to an output device.

The following portion of this paragraph delineates example 7 of the subject matter, disclosed herein. According to example 7, which encompasses example 6, above, the output device comprises an auto refueling system, a pilot director light system, or a boom operator system.

The following portion of this paragraph delineates example 8 of the subject matter, disclosed herein. According to example 8, a tanker aircraft includes a camera, a refueling boom, a camera configured to generate a 2D image of the refueling boom, a processor, and non-transitory computer readable storage media storing code. The code being executable by the processor to perform operations comprising receiving the 2D image from the camera, determining 2D keypoints of the refueling boom located within the 2D image based on a predefined point model of the refueling boom, determining a 6DOF pose using the 2D keypoints and corresponding 3D keypoints, and estimating a position of a tip of the refueling boom based on the 6DOF pose.

The following portion of this paragraph delineates example 9 of the subject matter, disclosed herein. According to example 9, which encompasses example 8, above, transforming the 2D keypoints to 3D space comprises performing a perspective-n-point algorithm using the 2D keypoints and the 3D keypoints to produce the 6DOF pose.

The following portion of this paragraph delineates example 10 of the subject matter, disclosed herein. According to example 10, which encompasses any of examples 8 or 9, above, the tanker aircraft further comprises a boom tip sensor and estimating the position of the tip of the refueling boom comprises receiving a boom tip extension value from the boom tip sensor and estimating the position of the tip of the refueling boom based on the boom tip extension value.

The following portion of this paragraph delineates example 11 of the subject matter, disclosed herein. According to example 11, which encompasses any of examples 8-10, above, estimating the position of the tip of the refueling boom comprises receiving a raytracing value of the tip of the refueling boom and estimating the position of the tip of the refueling boom based on the raytracing value.

The following portion of this paragraph delineates example 12 of the subject matter, disclosed herein. According to example 12, which encompasses example 11, above, receiving the raytracing value comprises identifying a boom tip key point within the 2D image to produce a 3D boom tip key point, identifying a horizontal plane between the camera and the 3D boom tip key point, and generating the raytracing value by identifying an intersection of a longitudinal boom axis and the horizontal plane.

The following portion of this paragraph delineates example 13 of the subject matter, disclosed herein. According to example 13, which encompasses any of examples 8-12, above, the tanker aircraft further comprises an output device and the processor further performs an operation of sending the position of the tip of the refueling boom to the output device.

The following portion of this paragraph delineates example 14 of the subject matter, disclosed herein. According to example 14, which encompasses example 13, above, the output device comprises an auto refueling system, a pilot director light system, or a boom operator system.

The following portion of this paragraph delineates example 15 of the subject matter, disclosed herein. According to example 15, a refueling system comprising a processor and non-transitory computer readable storage media storing code. The code being executable by the processor to perform operations comprising receiving a 2D image from a camera, determining 2D keypoints of a refueling boom located within the 2D image based on a predefined point model of the refueling boom, determining a 6DOF pose using the 2D keypoints and corresponding 3D keypoints, and estimating a position of a tip of the refueling boom based on the 6DOF pose.

The following portion of this paragraph delineates example 16 of the subject matter, disclosed herein. According to example 16, which encompasses example 15, above, transforming the 2D keypoints to 3D space comprises performing a perspective-n-point algorithm using the 2D keypoints and the 3D keypoints to produce the 6DOF pose.

The following portion of this paragraph delineates example 17 of the subject matter, disclosed herein. According to example 17, which encompasses any of examples 15 or 16, above, estimating the position of the tip of the refueling boom comprises receiving a boom tip extension value from a boom tip sensor and estimating the position of the tip of the refueling boom based on the boom tip extension value.

The following portion of this paragraph delineates example 18 of the subject matter, disclosed herein. According to example 18, which encompasses any of examples 15-17, above, estimating the position of the tip of the refueling boom comprises determining a raytracing value of the tip of the refueling boom and estimating the position of the tip of the refueling boom based on the raytracing value.

The following portion of this paragraph delineates example 19 of the subject matter, disclosed herein. According to example 19, which encompasses example 18, above, receiving the raytracing value comprises identifying a boom tip key point within the 2D image to produce a 3D boom tip key point, identifying a horizontal plane between the camera and the 3D boom tip key point, and generating the raytracing value by identifying an intersection of a longitudinal boom axis and the horizontal plane.

The following portion of this paragraph delineates example 20 of the subject matter, disclosed herein. According to example 20, which encompasses any of examples 15-19, above, the processor further performs an operation of sending the position of the tip of the refueling boom to an auto refueling system, a pilot director light system, or a boom operator system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method comprising:

receiving a two-dimensional (2D) image from a camera of a tanker aircraft;

determining 2D keypoints of a refueling boom located within the 2D image based on a predefined point model of a refueling boom;

determining a 6 degree-of-freedom (6DOF) pose using the determined 2D keypoints and corresponding three-dimensional (3D) space keypoints;

optimizing 3D keypoints associated with moveable components of the refueling boom by iteratively solving for a plurality of boom control parameters for the moveable components, based on a difference between the determined 2D keypoints and projected 2D keypoints generated by projecting the 3D keypoints onto the 2D image using the determined 6DOF pose to produce optimized 3D keypoints such that the projected 2D keypoints substantially align with the determined 2D keypoints; and estimating a position of the refueling boom based on the 6DOF pose and the optimized 3D keypoints.

2. The method of claim 1, wherein determining the 6DOF pose comprises performing a perspective-n-point algorithm using the determined 2D keypoints and the 3D keypoints to produce the 6DOF pose.

3. The method of claim 1, further comprising:

receiving a boom tip extension value; and estimating a position of a tip of the refueling boom based on the boom tip extension value.

4. The method of claim 1, wherein the boom control parameters comprise at least one angle between two components of the refueling boom, wherein at least one of the two components comprises a component that is moveable relative to a main body of the refueling boom.

5. The method of claim 1, wherein:

generating the projected 2D keypoints is based on the plurality of boom control parameters for the moveable components of the refueling boom;

the method further comprises:

determining the 6DOF pose prior to iteratively solving for the plurality of boom control parameters; and optimizing the 3D keypoints associated with moveable components of the refueling boom without re-determining the 6DOF pose.

6. The method of claim 5, wherein optimizing is performed using an initial value.

7. The method of claim 1, further comprising sending the position of the refueling boom to an output device.

8. The method of claim 7, wherein the output device comprises an automated refueling system, a pilot director light system, or a boom operator interface.

9. A tanker aircraft comprising:

a refueling boom;

a camera configured to generate a two-dimensional (2D) image of the refueling boom;

a processor; and non-transitory computer readable storage media storing code, the code being executable by the processor to perform operations comprising:

receiving the two-dimensional (2D) image from the camera;

determining 2D keypoints of the refueling boom located within the 2D image based on a predefined point model of the refueling boom;

determining a 6 degree-of-freedom (6DOF) pose using the determined 2D keypoints and corresponding three-dimensional (3D) space keypoints;

optimizing 3D keypoints associated with moveable components of the refueling boom by iteratively solving for a plurality of boom control parameters for the moveable components, based on a difference between the determined 2D keypoints and projected 2D keypoints generated by projecting the 3D keypoints onto the 2D image using the determined 6DOF pose to produce optimized 3D keypoints such that the projected 2D keypoints substantially align with the determined 2D keypoints; and estimating a position of a tip of the refueling boom based on the 6DOF pose and on the optimized 3D keypoints.

10. The tanker aircraft of claim 9, further comprising transforming the determined 2D keypoints to 3D space by performing a perspective-n-point algorithm using the determined 2D keypoints and the 3D keypoints to produce the 6DOF pose.

11. The tanker aircraft of claim 9, wherein:

the tanker aircraft further comprises a boom tip sensor; and estimating the position of the tip of the refueling boom comprises:

receiving a boom tip extension value from the boom tip sensor; and estimating the position of the tip of the refueling boom based on the boom tip extension value.

12. The tanker aircraft of claim 9, wherein the boom control parameters comprise at least one angle between two components of the refueling boom, wherein at least one of the two components comprises a component that is moveable relative to a main body of the refueling boom.

13. The tanker aircraft of claim 12, wherein optimizing comprises optimizing for a predefined amount of time or until a result is within a predefined range.

14. The tanker aircraft of claim 13, wherein optimizing is performed using an initial value.

15. The tanker aircraft of claim 9, wherein:

the tanker aircraft further comprises an output device; and the processor further performs an operation of sending the position of the tip of the refueling boom to the output device.

16. The tanker aircraft of claim 15, wherein the output device comprises an automated refueling system, a pilot director light system, or a boom operator interface.

17. A refueling system comprising:

a processor; and non-transitory computer readable storage media storing code, the code being executable by the processor to perform operations comprising:

receiving a two-dimensional (2D) image from a camera;

determining 2D keypoints of a refueling boom located within the 2D image based on a predefined point model of the refueling boom;

determining a 6 degree-of-freedom (6DOF) pose using the determined 2D keypoints and corresponding three-dimensional (3D) keypoints;

optimizing 3D keypoints associated with moveable components of the refueling boom by iteratively solving for a plurality of boom control parameters for the moveable components, based on a difference between the determined 2D keypoints and projected 2D keypoints generated by projecting the 3D keypoints onto the 2D image using the determined 6DOF pose to produce optimized 3D keypoints such that the projected 2D keypoints substantially align with the determined 2D keypoints; and estimating a position of a tip of the refueling boom based on the 6DOF pose and on the optimized 3D keypoints.

18. The refueling system of claim 17, further comprising transforming the 2D keypoints to 3D space by performing a perspective-n-point algorithm using the determined 2D keypoints and 3D keypoints to produce the 6DOF pose.

19. The refueling system of claim 17, wherein the boom control parameters comprise at least one angle between two components of the refueling boom, wherein at least one of the two components comprises a component that is moveable relative to a main body of the refueling boom.

20. The refueling system of claim 19, wherein optimizing comprises optimizing for a predefined amount of time or until a result is within a predefined range responsive to an initial value.

* * * * *